(12) United States Patent
Morgan et al.

(10) Patent No.: US 11,465,075 B2
(45) Date of Patent: Oct. 11, 2022

(54) FLEXIBLE LAUNDER COVERS AND RELATED METHODS

(71) Applicant: Industrial & Environmental Concepts, Inc., Edina, MN (US)

(72) Inventors: Michael Allan Morgan, Edina, MN (US); Michael Sean Gallant, Edina, MN (US); David Michael Anderson, White Bear Lake, MN (US); Brian Gene Cain, Edina, MN (US); Andrew James Anderson, Edina, MN (US)

(73) Assignee: Industrial & Environmental Concepts, Inc., Lakeville, MN (US)

( * ) Notice: Subject to any disclaimer, the term of this patent is extended or adjusted under 35 U.S.C. 154(b) by 80 days.

(21) Appl. No.: 16/993,505

(22) Filed: Aug. 14, 2020

(65) Prior Publication Data

US 2021/0046404 A1    Feb. 18, 2021

Related U.S. Application Data

(60) Provisional application No. 62/886,750, filed on Aug. 14, 2019, provisional application No. 62/887,404, filed on Aug. 15, 2019.

(51) Int. Cl.
*B01D 21/24* (2006.01)
*B01D 21/00* (2006.01)
*F16B 5/00* (2006.01)

(52) U.S. Cl.
CPC ..... *B01D 21/0003* (2013.01); *B01D 21/0006* (2013.01); *B01D 21/2444* (2013.01); *F16B 5/0008* (2013.01); *B01D 2201/40* (2013.01)

(58) Field of Classification Search
CPC ............ B01D 21/0003; B01D 21/0006; B01D 21/0042; B01D 21/0072; B01D 21/2444

(Continued)

(56) References Cited

U.S. PATENT DOCUMENTS

| 3,911,632 A | 10/1975 | Bryfogle et al. |
| 4,767,536 A | 8/1988 | Roley |

(Continued)

FOREIGN PATENT DOCUMENTS

| CA | 2501076 | 2/2008 |
| FR | 2736044 | 6/1995 |

OTHER PUBLICATIONS

Clarifier Covers | Sludge Covers | IEC. (2020). Retreived Aug. 17, 2020, from https://www.ieccovers.com/clarifier-tank-covers/.

(Continued)

*Primary Examiner* — Christopher Upton
(74) *Attorney, Agent, or Firm* — Norton Rose Fulbright US LLP

(57) ABSTRACT

A clarifier can comprise a floor, inner and outer walls that each extends upwardly from the floor such that a tank is at least partially defined by the inner wall and a launder channel is at least partially defined between the inner and outer walls and is disposed along at least a majority of a periphery of the tank. A launder cover comprising one or more flexible sheets can be disposed over at least a majority of the launder channel. Each of the sheet(s) can have opposing inner and outer edges, the inner edge coupled to the inner wall and the outer edge coupled to the outer wall, and can be configured such that, when a single one of the inner and outer edges is decoupled from the inner and outer walls, the sheet is deformable to at least partially uncover the launder channel.

20 Claims, 13 Drawing Sheets

(58) Field of Classification Search
USPC .................................. 210/528, 540, 541
See application file for complete search history.

(56) References Cited

U.S. PATENT DOCUMENTS

| | | |
|---|---|---|
| 5,670,045 A | 9/1997 | Schaller |
| 5,965,023 A | 10/1999 | Schaller |
| 6,216,881 B1 | 4/2001 | Schaller |
| 6,324,792 B1 | 12/2001 | DeGarie |
| 6,357,964 B1 | 3/2002 | DeGarie |
| 6,389,757 B1 | 5/2002 | DeGarie |
| 6,712,222 B2 | 3/2004 | Schaller |
| 7,374,059 B2 | 5/2008 | Morgan et al. |
| 7,430,834 B2 | 10/2008 | Degarie |
| 7,473,358 B1 | 1/2009 | Schaller |
| 7,591,381 B2 | 9/2009 | Schaller |
| 9,174,148 B2 | 11/2015 | Schaller |
| 9,873,068 B2 | 1/2018 | Schaller |
| 9,919,244 B2 * | 3/2018 | Heimdal ............ B01D 21/2444 |
| 11,052,329 B1 * | 7/2021 | Janssen ............... B01D 21/0006 |
| 2007/0138087 A1 * | 6/2007 | Aditham ............. B01D 21/0003 210/540 |
| 2009/0071904 A1 | 3/2009 | Degarie et al. |
| 2016/0236116 A1 * | 8/2016 | Schaller ............. B01D 21/0006 |
| 2018/0036654 A1 | 2/2018 | Schaller |
| 2021/0069614 A1 * | 3/2021 | Winters ............ B01D 21/0072 |
| 2021/0245076 A1 * | 8/2021 | Knowles ............ B01D 21/0003 |

OTHER PUBLICATIONS

Rimrach & Rimrach. How to Control Odors at Wastewater Treatment Plants—Pollution Equipment News. Retrieved Aug. 17, 2020 from https://www.pollutionequipmentnews.com/how-to-control-odors-at-wastewater-treatment-plants.

* cited by examiner

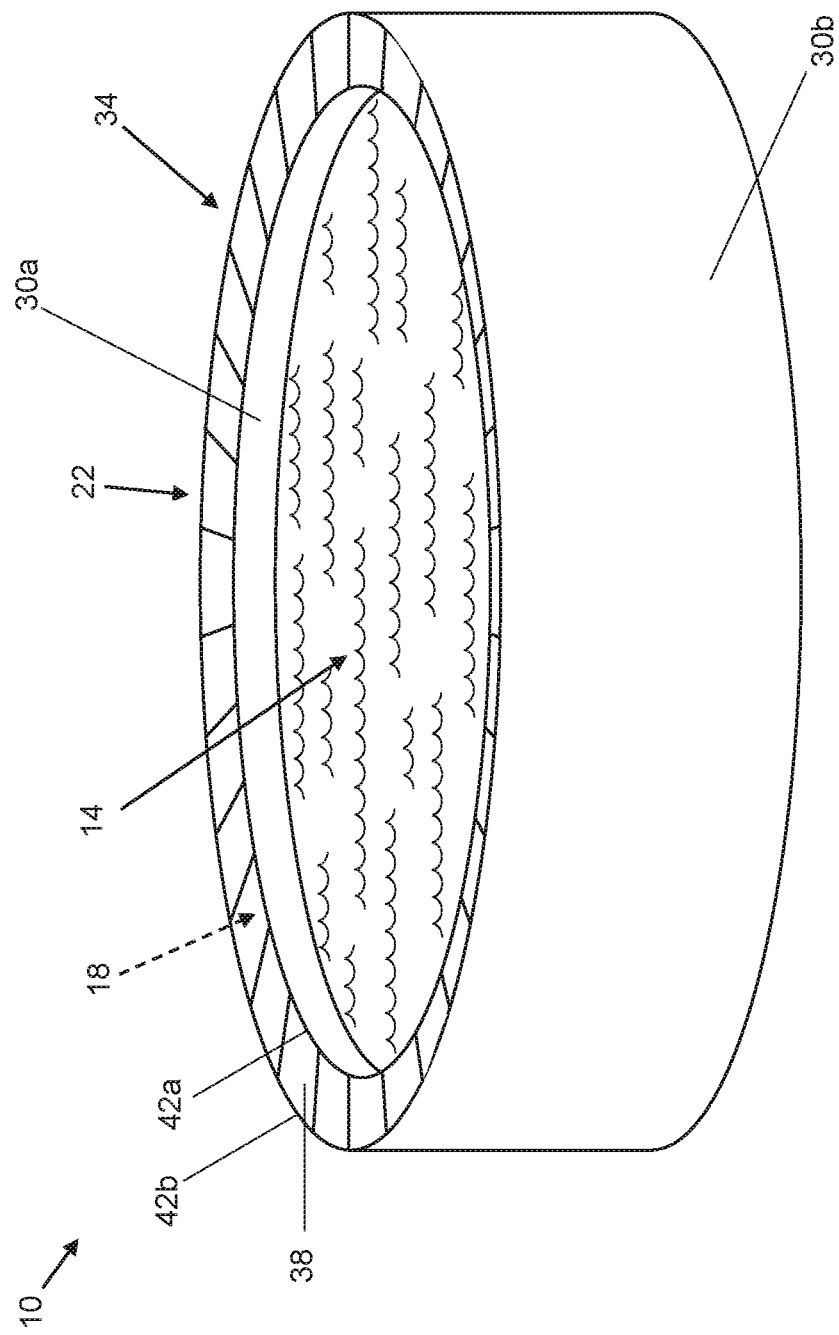

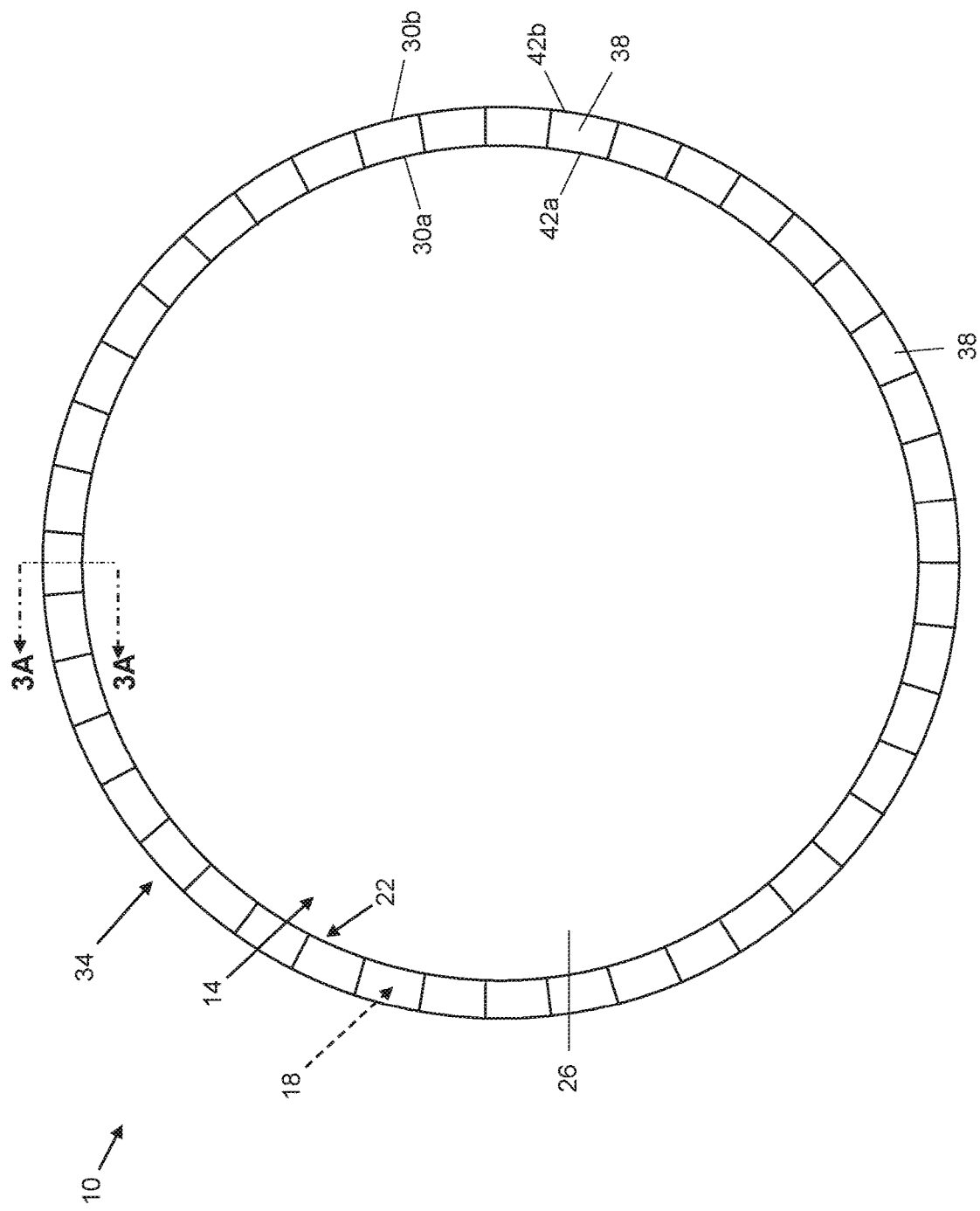

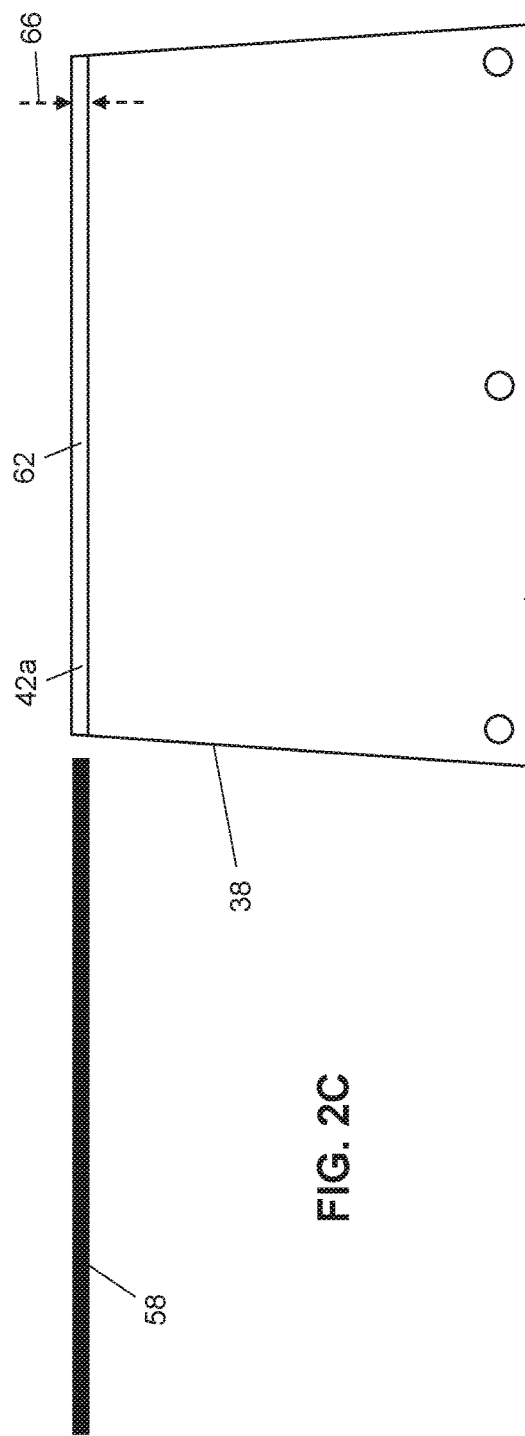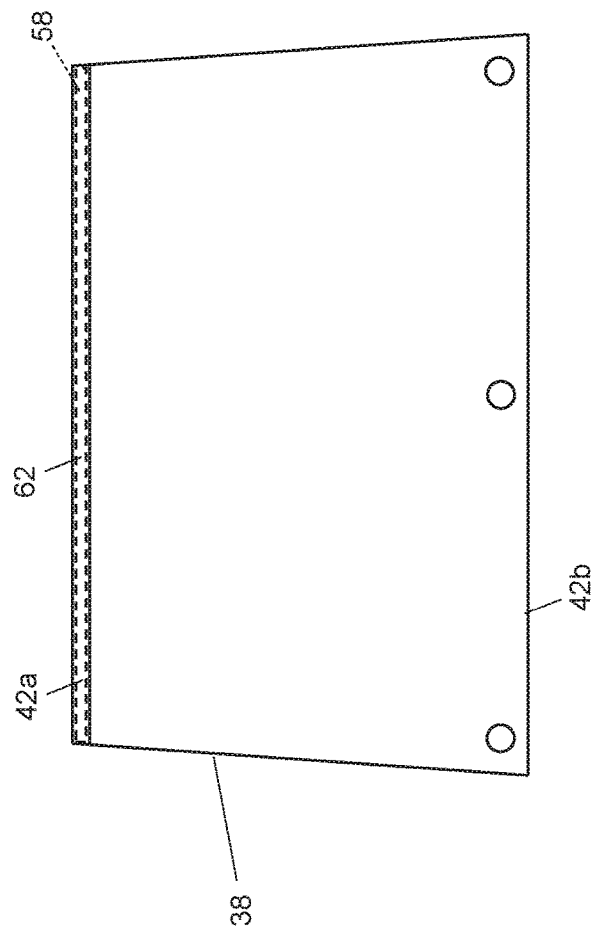
FIG. 2C
FIG. 2D

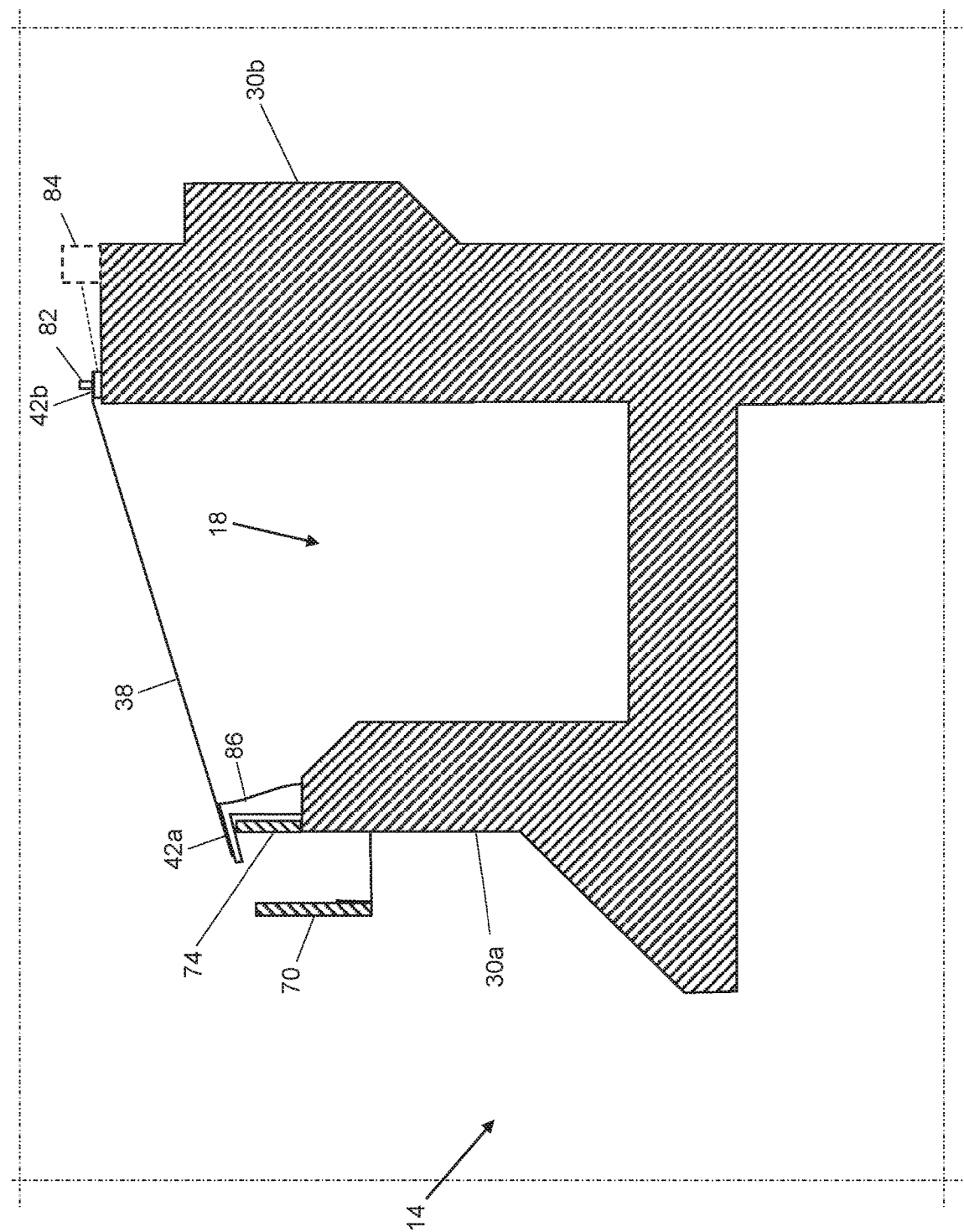

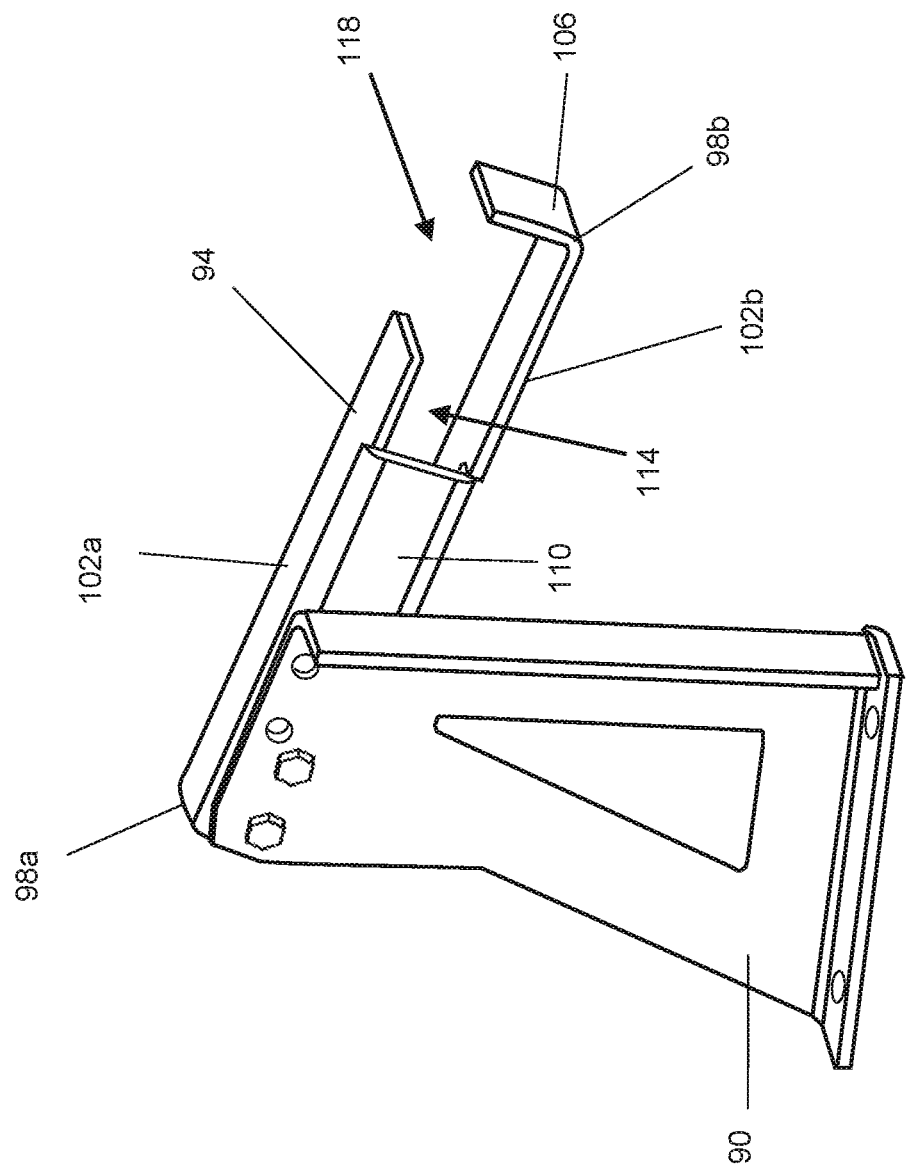

FLEXIBLE LAUNDER COVERS AND RELATED METHODS

CROSS-REFERENCE TO RELATED APPLICATIONS

This application claims priority to and the benefit of U.S. Provisional Application No. 62/886,750, filed Aug. 14, 2019, and U.S. Provisional Application No. 62/887,404, filed Aug. 15, 2019. The contents of the aforementioned applications are incorporated into the present application in their entirety.

FIELD OF INVENTION

The present invention relates generally to waste management, and more specifically, but not by way of limitation, to covers for and methods of covering a launder channel of a clarifier.

BACKGROUND

A clarifier, or sedimentation tank, is an integral part of cleaning and filtering waste water in a sewage treatment facility. Clarifiers are used for potable water and wastewater treatment plants. Typically, waste water enters the clarifier tank and is mixed such that the lighter, cleaner water is decanted from the heavier waste material. The displaced clean water is forced upward in the tank and eventually over a divider into a launder channel. Generally, the launder channel is defined between inner and outer walls of the clarifier and, normally, runs around the edge of the tank, or by one or more internal channels positioned around the perimeter of the tank.

Algae growth in the launder channel can pose challenges for sewage treatment facilities. Left unmanaged, algae can attach to surfaces of the clarifier, such as a weir, the inner and outer walls, and/or the clarifier floor. Such algae growth may increase total suspended solids (TSS) causing effluent concentrations to exceed discharge permits allowances or obstruct the hydrodynamic flow into the channel, cause damage to the clarifier tank, and/or cause other problems that can impede wastewater treatment.

Algae from the surfaces of the launder channel is typically removed by scrubbing the channel by hand or applying herbicide or cleaner to surfaces. Because clarifiers are typically quite large, this is a labor-intensive, tedious, and costly process. Some clarifiers include launder covers that can block sunlight to prevent the growth of algae on surfaces of the channel. Those covers include panels made from metal, fiberglass, or other rigid materials, each being hinged such that the panel can flip up to allow staff to clean the launders. The panels are usually held shut by a latch or locking tab located on either the inner side or outer side thereof. The location of the latch can make it difficult to access the launder channel of some clarifier tanks based on the direction the launder cover opens and type of maintenance performed. Additionally, conventional launder covers can be expensive—especially for the municipalities that often run sewage treatment facilities—and difficult to transport due to the rigid metal and fiberglass materials used to manufacture them.

SUMMARY

The present disclosure describes a cost-effective clarifier launder cover ("CLC") for preventing algae growth and acting as a barrier for the launder in a clarifier tank with improved ease of access. Some embodiments of the present cover may include a clarifier comprising a tank having a floor, an inner wall, an outer wall extending upwardly from the floor such that the tank is at least partially defined by the inner wall and a launder channel at least partially defined between the inner and outer walls and is disposed along at least a majority of a periphery of the tank. In such embodiments, clarifiers include a launder cover comprising one or more flexible sheets disposed over at least a majority of the launder channel. In some embodiments, each of the sheet(s) includes an opposing inner and outer edges, the inner edge coupled to the inner wall and the outer edge coupled to the outer wall and is configured such that, when a single one of the inner and outer edges is decoupled from the inner and outer walls, the sheet is deformable to at least partially uncover the launder channel.

Some embodiments include one or more brackets each including a base attached to the inner wall or outer wall and an arm that is coupled to the base and the inner edge or outer edge of one of the sheet(s). In some embodiments, the arm includes opposing proximal and distal ends, a receptacle defined between upper and lower portions of the arm, a stop extending upwardly from the lower portion at the distal end, an opening defined between the upper portion and the stop such that the opening is disposed closer to the distal end than is the receptacle, or combination thereof. In some embodiments, a portion of one of the sheet(s) extends along the upper portion of the arm, through the opening, and into the receptacle such that the inner edge of the sheet is disposed in the receptacle.

In some of the foregoing embodiments, each of the sheet(s) includes a rigid support member that extends along at least a majority of the inner or outer edge of the sheet. In some such embodiments, for each of the bracket(s), the rigid support member of one of the sheet(s) is disposed in the receptacle. In some embodiments, each of the sheet(s) comprises, for at least one of the inner and outer edges, a rigid support member that extends along at least a majority of the edge. In such embodiments, each of the sheet(s), for at least one of the inner and outer edges, defines a sleeve along at least a majority of the edge and comprises a rigid support member disposed in the sleeve. In at least some embodiments, the outer edge of each of the sheet(s) is coupled to the outer wall via one or more straps.

In some of the present clarifiers, the one or more sheets comprise two or more sheets. In such embodiments, each of the sheets has opposing first and second side edges, each extending between the inner and outer edges and is positioned such that at least one of the side edges is adjacent to one of the side edges of another one of the sheets. In some embodiments, for each of the sheet(s) the outer edge is positioned at a height above the inner edge such that the sheet is inclined downward from the outer wall to the inner wall. In some embodiments, each of the sheet(s) comprises a geomembrane.

Some embodiments of the present covers include one or more flexible sheets positionable over at least a majority of a launder channel that is at least partially defined between inner and outer walls of a clarifier. In such embodiments, each of the sheet(s) includes opposing inner and outer edges, the inner edge configured to be coupled to the inner wall and the outer edge configured to be coupled to the outer wall and is configured such that, when a single one of the inner and outer edges is decoupled from the inner and outer walls, the sheet is deformable to at least partially uncover the launder channel. Some cover of the present disclosure include one or more brackets each including a base attached to the inner wall or outer wall and an arm that is coupled to the base and the inner edge or outer edge of one of the sheet(s). In some embodiments, the arm includes opposing proximal and distal ends, a receptacle defined between upper and lower portions of the arm, a stop extending upwardly from the lower portion at the distal end, an opening defined between the upper portion and the stop such that the opening is disposed closer to the distal end than is the receptacle, or combination thereof. In some embodiments, a portion of one of the sheet(s) extends along the upper portion of the arm, through the opening, and into the receptacle such that the inner edge of the sheet is disposed in the receptacle.

In some embodiments, for each of the sheet(s), a rigid support member configured to extend along at least a majority of the inner edge or outer edge of the sheet, where for each of the bracket(s), the receptacle of the arm is configured to receive one of the support member(s). Some of the present covers comprise straps. Some such embodiments include, for each of the sheet(s), one or more straps configured to couple the outer edge of the sheet to the outer wall. In some embodiments, the cover may include for each of the sheet(s), for at least one of the inner and outer edges a rigid support member. In some such embodiments, the sheet defines a sleeve along at least a majority of the edge configured to receive the rigid support member. In some embodiments, each of the sheet(s) comprises a geomembrane. In some foregoing embodiments, for each of the sheet(s) each of the inner and outer edges is linear and a length of the outer edge is at least 1% larger than a length of the inner edge. In some embodiments, the length of the outer edge is at least 2% larger (e.g., 10%) than a length of the inner edge. In at least some embodiments, the one or more sheets comprises two or more sheets the sheets are disposed in a package and each of the sheets is rolled.

Some of the present embodiments comprise a method of covering a launder channel that is at least partially defined between inner and outer walls of a clarifier. Some such methods include disposing one or more flexible sheets over at least a majority of the launder channel at least by, for each of the sheet(s), coupling an inner edge of the sheet to the inner wall and an outer edge of the sheet that is opposite the inner edge to the outer wall, where each of the sheet(s) is configured such that, when a single one of the inner and outer edges is decoupled from the inner and outer walls, the sheet is deformable to at least partially uncover the launder channel and where the inner wall at least partially defines a tank such that the launder channel is disposed along at least a majority of a periphery of the tank. In some of the present methods, each of the sheet(s) comprises a geomembrane.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed configuration, the term "substantially" may be substituted with "within [a percentage] of" what is specified, where the percentage includes 0.1, 1, 5, and 10 percent.

Further, a structure that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, and by way of example, a launder cover that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any configuration of any of the launder covers, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one configuration may be applied to other configurations, even though not described or illustrated, unless expressly prohibited by this disclosure or the nature of the configurations.

Some details associated with the configurations described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 1A is a schematic, perspective view of a clarifier with an embodiment of the present launder covers disposed over the launder channel thereof and liquid disposed in the tank.

FIG. 1B is a schematic top view of the clarifier of FIG. 1A, with no liquid disposed in the tank.

FIGS. 2C and 2D are a top views of one of the flexible sheets of the launder cover shown in FIG. 1A and illustrate how a support member of the sheet can be inserted into a sleeve thereof.

FIG. 3A is a sectional view of the clarifier of FIG. 1A taken along line 3A-3A in FIG. 1B and illustrates how one of the flexible sheets of the launder cover can be coupled to the clarifier's inner and outer walls.

FIGS. 4A and 4B are perspective and side views, respectively, of a bracket that can be used to couple the inner edge of a flexible sheet of a launder cover to the inner wall of a clarifier.

DETAILED DESCRIPTION

Figure 2A:
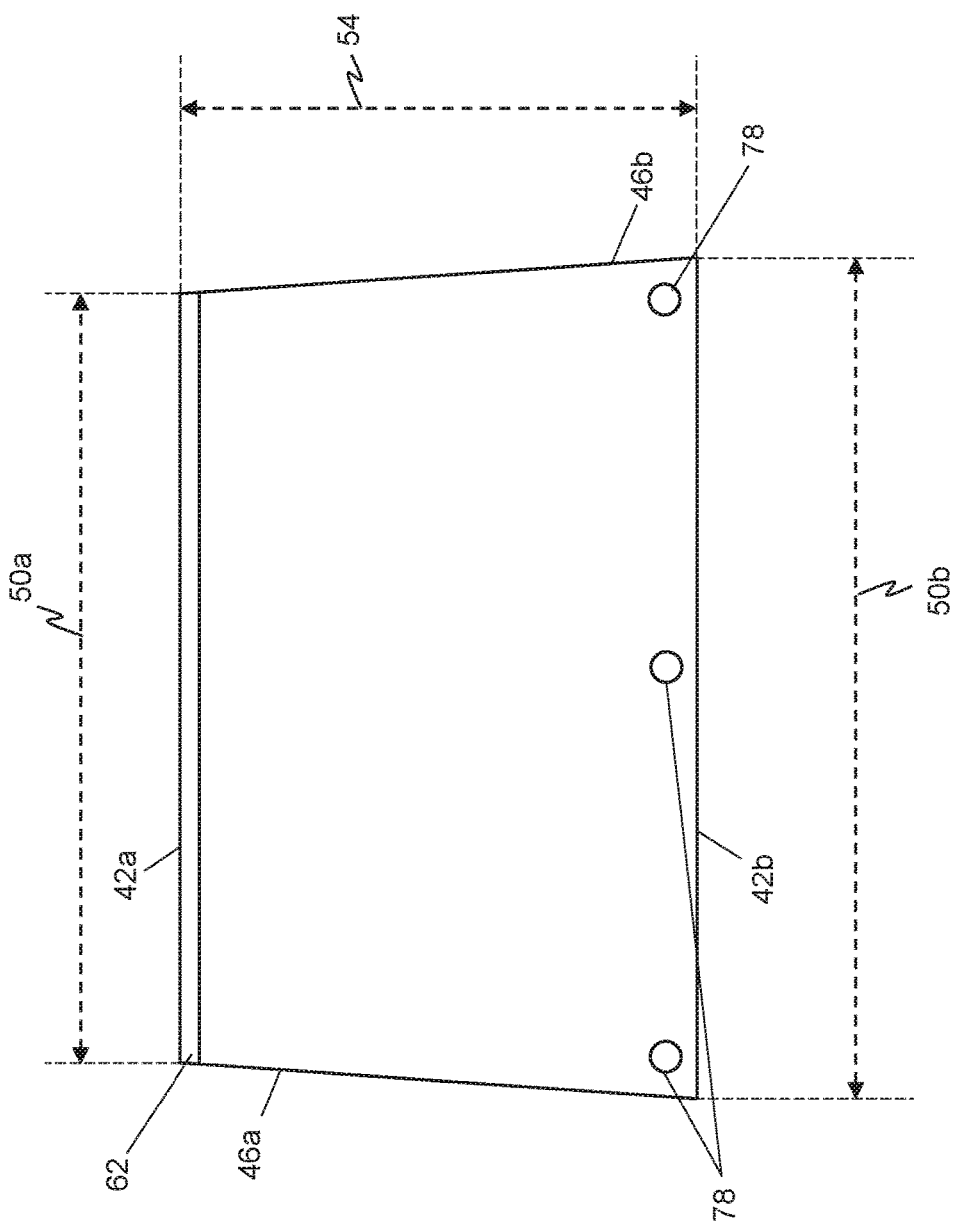
FIG. 2A is top view of one of the flexible sheets of the launder cover shown in FIG. 1A.

Referring to FIGS. 1A and 1B, shown is an embodiment 10 of the present clarifiers that includes a tank 14 and a launder channel 18 that is disposed along at least a majority (up to and including all) of periphery 22 of the tank. Clarifier 10 can include a floor 26 and inner and outer walls 30a and 30b. Each of inner and outer walls 30a and 30b can extend upwardly from floor 26 such that tank 14 is at least partially defined by the inner wall and launder channel 18 is at least partially defined between the inner and outer walls. In other embodiments, inner wall 30a may be attached to and supported by (e.g., hanging from) outer wall 30b such that inner wall 30a extends downward toward floor 26 to at least partially define tank 14. As shown, each of inner and outer walls 30a and 30b is circular; in other embodiments, however, each of the walls can have any suitable shape, such as polygonal (e.g., square, rectangular, hexagonal, octagonal, and/or the like), elliptical, and/or the like and can be a single piece or multiple pieces.

An embodiment 34 of the present launder covers can comprise one or more flexible sheets 38 that are positionable over at least a majority (up to and including all) of launder channel 18. For example, each of flexible sheet(s) 38 can be configured to extend from outer wall 30b to an inner wall 30a and the sheet(s) can be disposable along periphery 22 of tank 14. Launder cover 34 may comprise a single flexible sheet 38 or multiple flexible sheets that can collectively provide such coverage of launder channel 18, such as greater than or equal to any one of, or between any two of, 1, 2, 5, 10, 15, 20, 25, 30, 35, 40, 45, 50, 55, 60, 65, 70, 75, 80, 85, 90, 95, 100, 105, 110, 120, 130, 140, or 150 sheets. As shown, launder cover 34 includes multiple sheets 38 that are disposed over an entirety of launder channel 18. Launder cover 34 may accordingly be able to block sunlight from reaching launder channel 18 such that algae growth in the channel is mitigated.

Figure 2B:
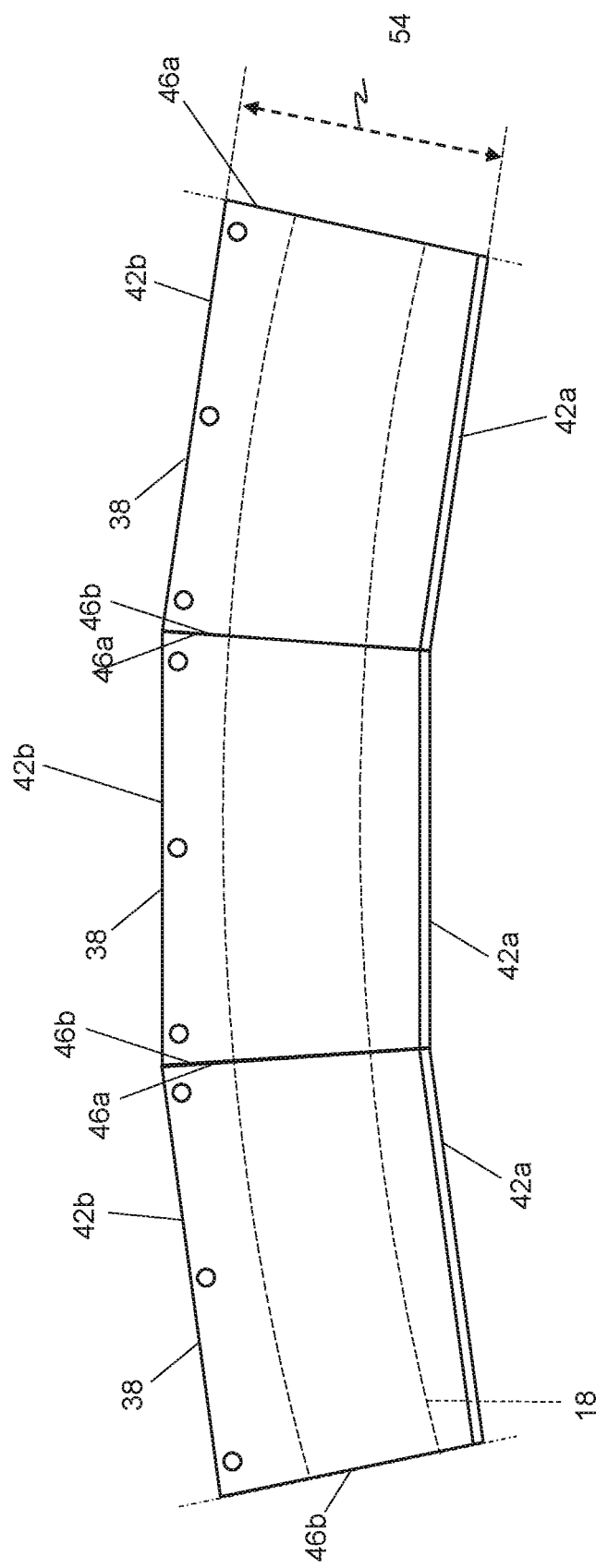
FIG. 2B is a top view of three of the flexible sheets of the launder cover shown in FIG. 1A and illustrates how the sheets are positionable relative to one another to provide coverage of a launder channel (shown in dashed lines).

Referring additionally to FIGS. 2A and 2B, each of sheet(s) 38 can be shaped and sized to facilitate coverage of launder channel 18. As shown, for example, each of flexible sheet(s) 38 can have opposing inner and outer edges 42a and 42b and opposing first and second side edges 46a and 46b that each extends between the inner and outer edges. Each of edges 42a, 42b, 46a, and 46b can be linear, arcuate, undulating or otherwise curved, and/or the like; as shown, each of the edges is linear, which can facilitate manufacturing thereof. When launder channel 18 is, for example, annular (e.g., as shown), outer edge 42b can have a length 50b that is larger than (e.g., at least 2% larger than) a length 50a of inner edge 42a such that the sheet(s) can cooperate to follow periphery 22 of tank 14. For example, outer edge 42b may have a length 50b that is between 1% and 10% larger than a length 50a of inner edge 42a, yet in other embodiments, length 50b is at least 10% larger than length 50a.

Lengths 50a and 50b can each be linear lengths (e.g., when inner and outer edges 42a and 42b are linear), arc lengths (e.g., if the inner and outer edges are arcuate), and/or the like. At least one of lengths 50a and 50b can be greater than or equal to any one of, or between any two of: 2, 4, 5, 6, 8, 9, 10, 12, 15, 20, 25, 30, 35, 40, 45, 50, 75, 100, 150, or 200 feet (ft.) (e.g., between 7 and 10 ft., such as approximately 8.7 ft.). Each of sheet(s) 38 can have a width 54, measured between inner edge 42a and outer edge 42b along a straight line that is substantially perpendicular to at least one of the inner and outer edges, that is greater than or equal to any one of, or between any two of: 1, 2, 3, 4, 5, 6, 7, 8, 9, 10, 11, 12, ft. (e.g., between 4 and 7 ft., such as approximately 5.3 ft.).

As shown, when launder cover 34 includes multiples sheets 38, the sheets as shaped and sized can be positioned together such that, for each of the sheets, at least one of first and second side edges 46a and 46b is adjacent to—and optionally in contact with—one of the side edges of another one of the sheets to provide coverage of launder channel 18. In this way, each of sheet(s) 38 can be configured to at least partially uncover a selected portion of launder channel 18 independent from other one(s) of the sheets (described in further detail below) such that that portion can be accessed without uncovering the entire launder channel. Alternatively, each of sheet(s) 38 can overlap at least one other of the sheets. For any two overlapping sheets 38, a region in which the sheets overlap can have a width that is greater than or equal to any one of, or between any two of, 1.0, 2.5, 5.0, 10.0, 15.0, 20.0, 25.0, 30.0, 35.0, 40.0, 45.0, or 50.0 cm (e.g., between 2.5 and 20 cm or 5 and 35 cm). In some embodiments, a side edge (e.g., 46a) of a sheet may be freely moveable relative to a side edge (e.g., 46b) of one other sheet; however, in other embodiments, a side edge (e.g., 46a) of one sheet may be coupled to a side edge (e.g., 46b) of one other sheet via fasteners (e.g., zip-ties, nuts and bolts, screws, pins, and/or the like), ratchets, strapping, elastic or rubber connectors (e.g., bungee cord), straps, adhesives, hook and loop fasteners (e.g., Velcro®), friction, gravity, cable, robe, string, or other connectors (described in further detail at least with reference to FIGS. 5A and 5B). In this way, clarifier 10 may maintain its position while covering launder cannel 18 even in extreme conditions (e.g., high wind, rain, hail, or the like).

Each of sheet(s) 38 can comprise any suitable flexible material to block sunlight, such as a geotextile, a geosynthetic, a geomembrane, a liner or containment liner, a mat, geomat, or erosion control mat, a geosynthetic clay liner, a geocomposite, geofoam, and/or the like. In the depicted embodiment, each of flexible sheet(s) 38 comprises a geomembrane. The flexible geomembrane may comprise of any suitable material such as, for example, any one of or combination of the following: high-density polyethylene (HDPE), linear low-density polyethylene (LLDPE), polyvinyl chloride (PVC), polypropylene (fPP), chlorosulfonated polyethylene (CSPE), ethylene propylenediene terpolymer (EPDM), polyester, and/or the like. Each of sheet(s) 38 may be free of relatively expensive materials such as fiberglass, XR-5, XR-3, Ethylene Interpolymer Alloy (EIA), but maybe scrim-reinforced with polyester or other synthetic textile.

In some implementations, the flexibility of a given sheet 38 may be such that the sheet may be unable to hold its shape when supported at only one end (e.g., 42a) and subjected to gravity. Additionally, or alternatively, the flexibility of a given sheet 38 may allow the sheet to be folded or rolled without causing inelastic deformation of the sheet, such that, for example, if the sheet is in a flat (planar) configuration, folded over on itself, and then returned to the flat configuration, any final angular deformation of the sheet at the fold line will be less than or equal to 15 degrees, preferably less than 5 degrees. Further, the flexibility of a given sheet 38 can allow dissipation of any final angular deformation at the fold line after it is returned to the flat configuration for a period of time, such as between 30 minutes and 6 hours, and sunlight and/or a higher ambient temperature will more quickly facilitate such dissipation. This flexibility of the sheet may avoid issues with accessing the launder channel (e.g., 18) that are common to traditional rigid covers (e.g., hinged fiberglass covers).

In these embodiments, the geomembrane may be ultra violet (UV) stabilized, UV inhibited, and/or UV resistant to prevent UV degradation of flexible sheet(s) 38. Flexible sheet(s) 38 may also be water resistant or waterproof to prevent or eliminate water/moisture absorption. In some embodiments, each of flexible sheet(s) 38 may comprise a material that is inherently UV stable and has low moisture absorption, while in other embodiments, a chemical or film may be added to the geomembrane to produce such effects. In this way, launder cover 34 may comprise inexpensive flexible sheet(s) 38 to cover a large surface area of launder channel 18 at relative low cost.

Referring additionally to FIGS. 2C and 2D, launder cover 34 can comprise, for each of sheet(s) 38, one or more rigid support members 58 that can be coupled to the sheet to provide structural support and/or facilitate coupling of the sheet to clarifier 10, while maintaining the flexibility of the sheet. Each of support member(s) 58 can comprise any suitable rigid material, including but not limited to wood, a metal, a polymer, a composite material, and/or the like. To facilitate coupling of support member(s) 58 to sheet 38, the sheet can define, for at least one of inner edge 42*a*, outer edge 42*b*, first side edge 46*a*, and second side edge 46*b*, a sleeve 62 along at least a majority of the edge; as shown, the sheet defines a sleeve along the entirety of the inner edge, but in other embodiments a sleeve can also be defined along at least one of the other edges (e.g., the outer edge in addition to the inner edge). Each of sleeve(s) 62 can be defined by a fold in the flexible material of sheet 38 or by another piece of material attached thereto, and can have a maximum transverse dimension 66, measured in a direction perpendicular to the edge along which the sleeve is defined, that is greater than or equal to any one of, or between any two of, 0.5, 1.0, 2.0, 2.5, 3.0, 3.5, 4.0, 5.0, 6.0, 7.0, 8.0, 9.0, 10.0, or 12.0 cm. In this manner, each of sleeve(s) 62 can be configured to receive one of support member(s) 58 such that the rigid support member, when disposed therein, extends along at least a majority of the edge (e.g., inner edge 42*a*) along which the sleeve is defined (FIG. 2D). However, in embodiments, support member(s) 58 can be coupled to sheet 38 in any suitable manner, whether along edges 42*a*, 42*b*, 46*a*, and/or 46*b* or in the area bounded by the edges (e.g., to act as a linear or arcuate rib). In other embodiment, launder cover 34 may comprise sheet(s) 38 without sleeve 42*a* or rigid support member(s) 58 and may be mechanically attached to the inner 30*a* or outer 30*b* walls without a rigid support structure.

Figure 3B:
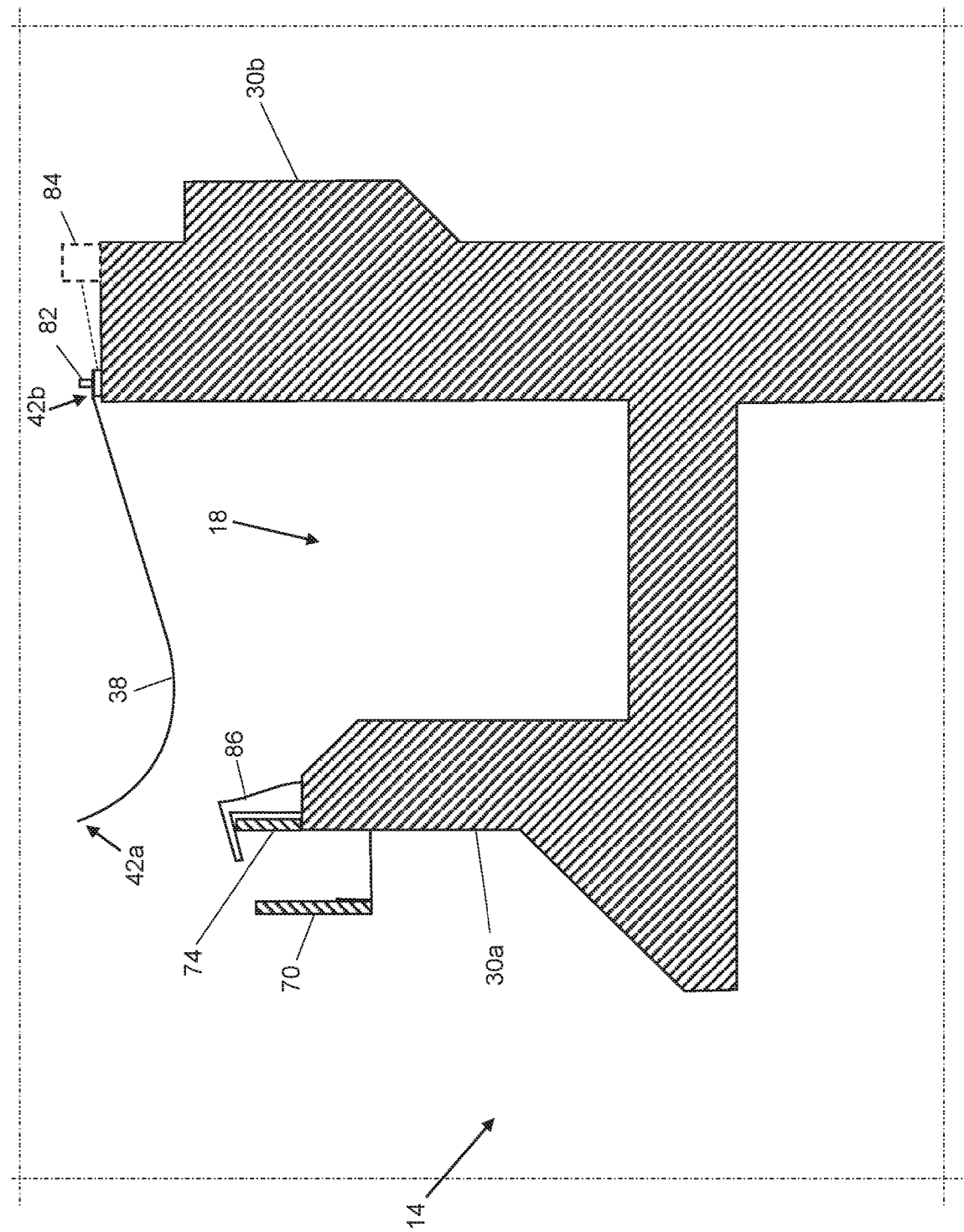
FIG. 3B is a sectional view of the clarifier of FIG. 1A illustrating how one of the flexible sheets can be deformed to at least partially uncover the launder channel.

Referring additionally to FIGS. 3A and 3B, each of sheet(s) 38 can be coupled to inner and outer walls 30*a* and 30*b* in a manner that can mitigate sheet wear and facilitate access to launder channel 18. As shown, inner edge 42*a* can be coupled to inner wall 30*a* and outer edge 42*a* can be coupled to outer wall 42*b* such that sheet 38 covers a portion of launder channel 18. Outer edge 42*b* can, but need not, be positioned at a height above inner edge 42*a* such that sheet 38 is inclined downward from outer wall 30*b* to inner wall 30*a*. Consequently, when launder cover 34 is disposed over launder channel 18, sheet(s) 38 can facilitate drainage of precipitation into tank 14. Clarifier 10 may comprise a scum baffle 70 coupled to inner wall 30*a* to prevent floating particles from entering launder channel 18 and/or an effluent weir 74 coupled to inner wall to meter the flow of liquids into the launder channel. Each of sheet(s) 38 can be positioned such that the sheet is at least partially disposed over scum baffle 70 and/or weir 74 to block them from sunlight. For example, as shown, inner edge 30*a* extends past weir 74 and, horizontally, is positioned between the weir and scum baffle 70 to mitigate algae growth on the weir.

Inner and outer edges 42*a* and 42*b* can be coupled to inner and outer walls 30*a* and 30*b*, respectively, in any suitable fashion, such as, for example, via fasteners (e.g., zip-ties, nuts and bolts, screws, pins, and/or the like), ratchets and strapping, elastic or rubber connectors, straps, adhesives, friction, and/or the like. For example, each of sheet(s) 38 may define one or more openings 78 at inner edge 42*a* and/or outer edge 42*b* and, for each of the opening(s), a fastener 82 can extend through the opening. In some embodiments, sheet(s) 38 may define opening 78 along a side edge (e.g., 46*a* and/or 46*b*) (described with further detail with reference to FIGS. 5A and 5B. As shown, multiple openings 78 are defined at the outer edge 42*b* and a fastener 82 extends through each to secure the outer edge to outer wall 30*b*. In some embodiments, a tensioning device 84 may be coupled to inner 30*a* or outer wall 30*b* to connect fastener 82 or sheet 38 to the inner or outer walls. Tensioning device 84 may comprise one or more of ratchets, straps, elastic or rubber connectors, rope, cables, belts, turnbuckles, cams, levers, rigging screws, springs, strapping tensioners, automatic tensioners, or the like. If one or more tensioning device(s) 84 (e.g., ratchet straps) are used, the tensioning device(s) can be coupled to inner wall 30*a* and/or outer wall 30*b* and attached to sheet 38 (e.g., via fastener(s) 82 that extend through opening(s) 78, whether or not those fasteners are secured to one of the walls) such that the tensioning device(s) can tension the sheet to reduce the risk of damage caused by wind or water accumulation. The couplings can also be achieved via one or more intermediate structures (e.g., brackets, railings, metal hardware, the ground adjacent to outer wall 30*b*, and/or the like) that are attached to inner wall 30*a* and/or outer wall 30*b*. As shown, for example, inner edge 42*a* of each of sheet(s) 38 can be coupled to inner wall 30*a* via one or more brackets 86 (described below in reference to FIGS. 4A-4D) that are attached to the inner wall. While an exemplary embodiment of bracket 86 is depicted, sheet(s) 38 may be coupled to inner wall 30*a* or outer wall 30*b* via any other suitable bracket known in the art.

At least one (including both) of inner and outer edges 42*a* and 42*b* of each of sheet(s) 38 can be decoupleable from inner and outer walls 30*a* and 30*b*, respectively, to permit access to a portion of launder channel 18 (e.g., for cleaning) that is covered by the sheet. To at least partially uncover launder channel 18, a single one of inner and outer edges 42*a* and 42*b* can be decoupled from inner and outer walls 30*a* and 30*b* (e.g., such that the other of the edges remains coupled). Sheet 38, at least in part because it comprises a flexible material, can be deformable when this occurs to at least partially uncover launder channel 18 (FIG. 3B). If sheet 38 includes support member(s) 58, each the support member(s) can be positioned to permit this deformation (e.g., by being disposed along one of inner and outer edges 42*a* and 42*b* or along less than all of one of side edges 46*a* and 46*b*). The deformability of sheet 38 can provide easy access to launder channel 18 without the need for a hinge—as shown, for example, the inner and outer edges are not coupled to the inner and outer walls with a hinge. Additionally, sheet 38 and the couplings to inner and outer walls 30*a* and 30*b* can be configured such that the sheet is deformable to at least partially uncover launder channel 18 both (1) when the inner edge is decoupled from the inner wall while the outer edge is coupled to the outer wall, and (2) when the inner edge is coupled to the inner wall while the outer edge is decoupled from the outer wall. This can allow a technician to choose which of edges 42*a* and 42*b* to decouple when uncovering a portion of launder channel 18 based on which provides the most convenient access to the launder channel, a feature unavailable in conventional hinged designs.

Figure 4B:
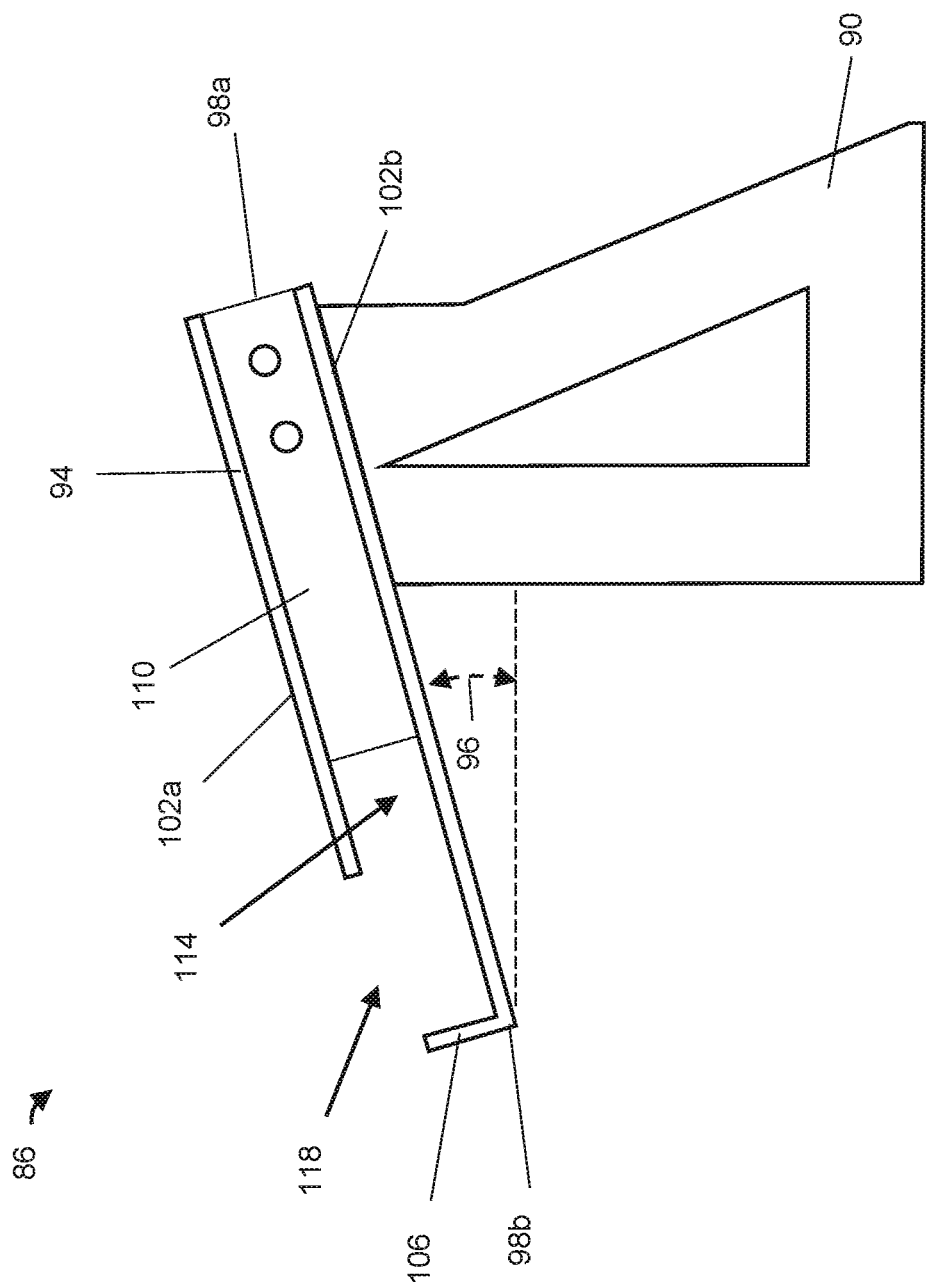

Referring to FIGS. 4A-4B, shown is one of bracket(s) 86 of launder cover 34 that can be used to couple one of sheet(s) 38 to clarifier 10 (e.g., to couple inner edge 42*a* to inner wall 30*a*). Bracket 86 can be configured to secure, for example, inner edge 42*a* while allowing easy removal thereof for access to launder channel 18. Bracket 86 can comprise a base 90 and an arm 94 that extends between opposing proximal and distal ends 98*a* and 98*b*. Base 90 can be attached to (and extend upwardly from) inner wall 30*a* when bracket 86 is attached to the inner wall. Arm 94 can be coupled to base 90 at its proximal end 98*a*, optionally such that, when the base is attached to the inner wall, the arm is angularly disposed relative to a direction taken horizontally between inner and outer walls 30*a* and 30*b* by an angle 96 that is greater than or equal to any one of, or between any two of, 10, 15, 20, 25, 30, 35, 40, 45, 50, 55, 60, 65, or 70 degrees. The inclination of arm 94 can facilitate the above-described inclination of one of sheet(s) 38 that is coupled to the arm. In some embodiments, bracket(s) 86 may be fabricated from metal, polymer, wood, composite, or combination thereof.

Arm 94 can comprise upper and lower portions 102*a* and 102*b* (e.g., upper and lower walls), a stop 106 that extends upwardly from lower portion 102*b* at distal end 98*b*, and, optionally, a side portion 110 (e.g., a side wall) that extends between upper and lower portions and not to the distal end. In this manner, arm 94 can define a receptacle 114 between upper and lower portions 102*a* and 102*b* and an opening 118 between the upper portion and stop 106, the opening being closer to distal end than is the receptacle.

Figure 4C:
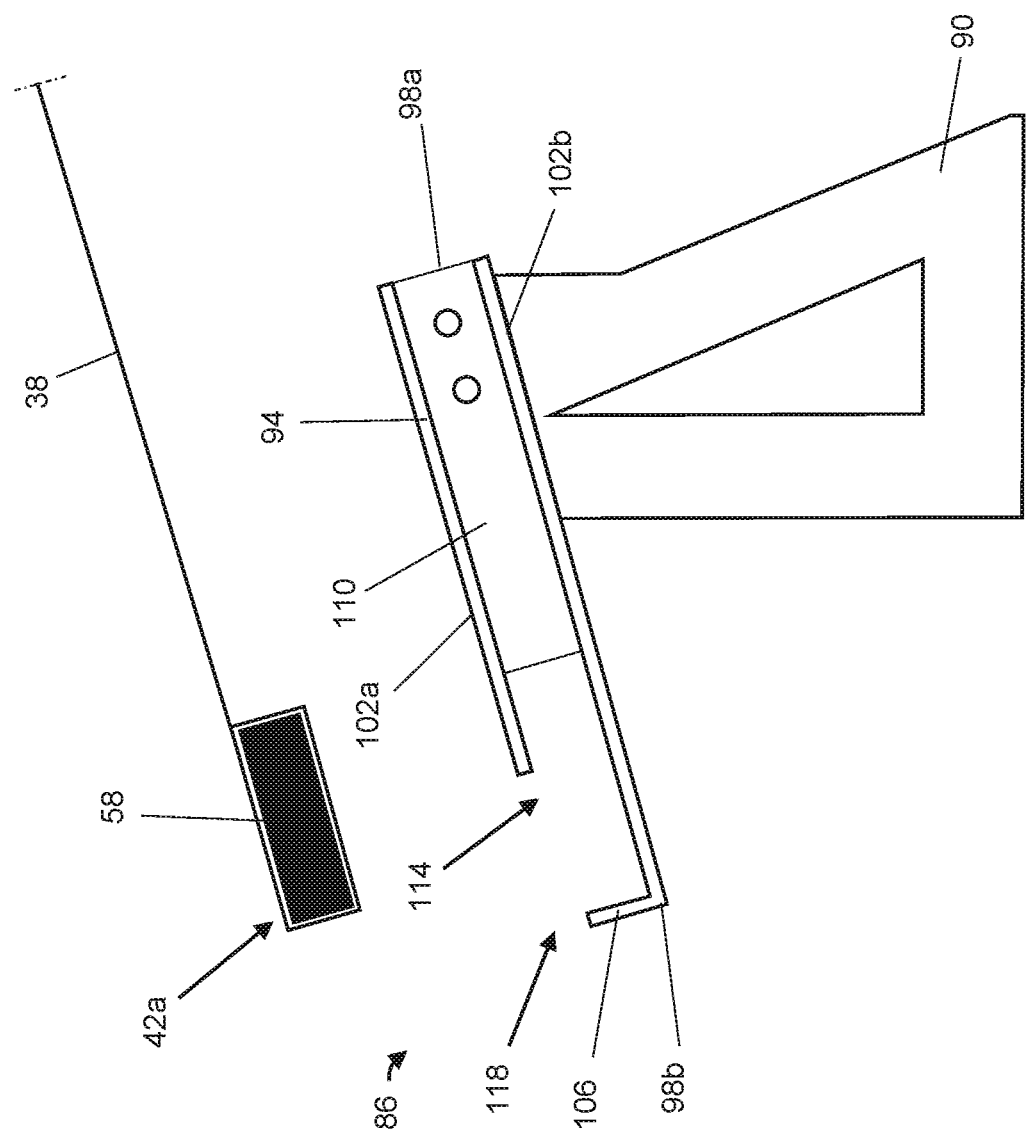
FIG. 4C shows a side view of the bracket of FIG. 4A with a flexible sheet that is used to cover the launder channel.
Figure 4D:
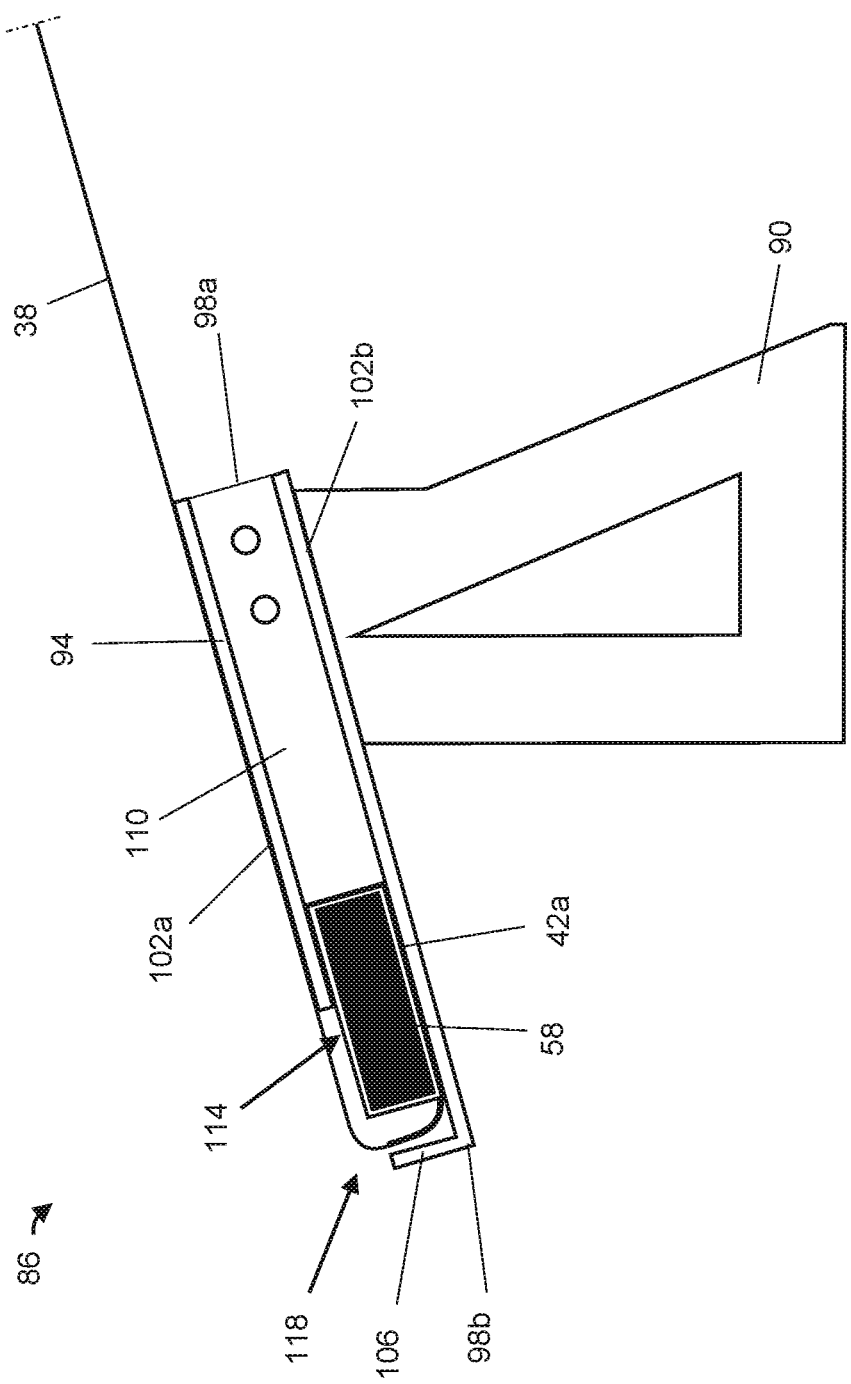
FIG. 4D shows an example of the bracket of FIG. 4A with the inner edge of a flexible sheet disposed in the bracket's receptacle.

Referring to FIGS. 4C-4D, various examples of a flexible sheet 38 being coupled to bracket 86 are shown. In the depicted embodiments, support member 58 may be disposed in receptacle 114 to secure a sheet (e.g., 38) to bracket 86. As shown, receptacle 114 can be configured to receive one of support member(s) 58 (e.g., while the support member is disposed along at least a majority of inner edge 42*a*), which can promote securement between stop 106 and side portion 110. For example, the components of arm 94 can be configured such that a portion of one of sheet(s) 38 can extend along upper portion 102*a* (e.g., on the upper surface thereof), through opening 118, and into receptacle 114 such that inner edge 42*a* is disposed in the receptacle. In some embodiments, inner edge 42*a* of sheet 38 (as well as support member 58 and sleeve 62) may be rotated (from, e.g., their positions shown in FIG. 4C) such that a portion of the sheet is folded back on itself and inserted into receptacle 114 (e.g., in a direction toward distal end 98*a*), as reflected in FIG. 4D. In other embodiments, support member 58 may be disposed within receptacle 114 without any substantial rotation (e.g., without a portion of sheet 38 folding back on itself) to secure the sheet to bracket 86. In some such embodiments, sleeve 62 may rotate freely relative to support member 58 so that a portion of sheet 38 extending from the sleeve may be positioned to counteract any external forces acting on the sheet. Support member 58 may be sized to fit snugly within receptacle 114 such that sheet 38 is secured, at least partially, by friction and/or normal forces between arm 94 and support member 58; however, support member 58 may be coupled to bracket 86 in any suitable fashion, such as, for example, via fasteners (e.g., zip-ties, nuts and bolts, screws, pins, and/or the like), ratchets and strapping, elastic or rubber connectors, straps, adhesives, friction, and/or the like.

Figure 5A:
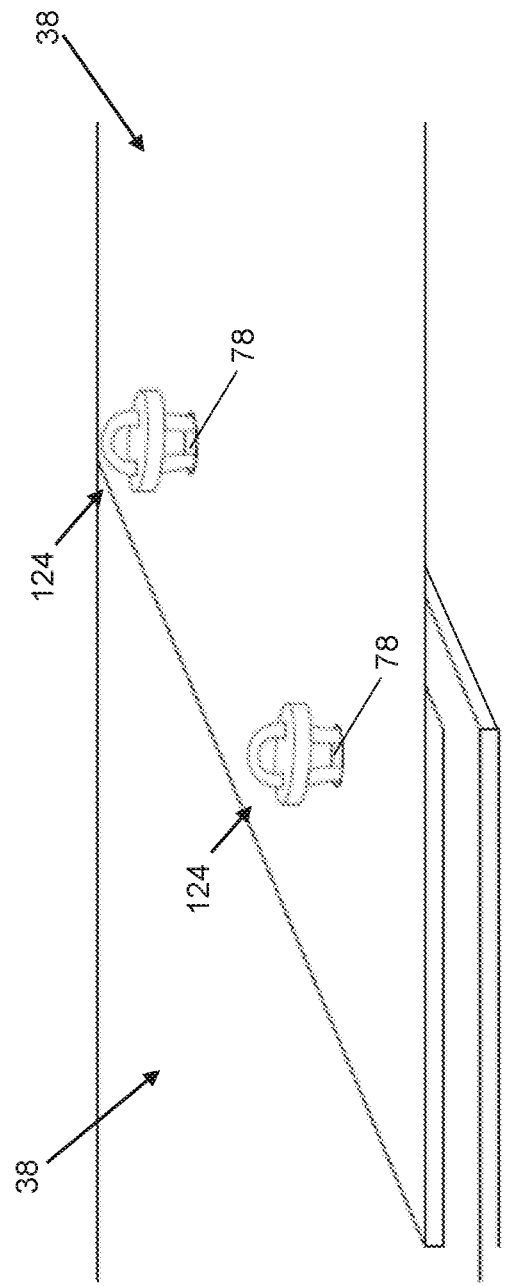
FIGS. 5A and 5B are perspective and side views, respectively, of a fastener that can be used to couple a flexible sheet of a launder cover to one other flexible sheet of the launder cover.
Figure 5B:
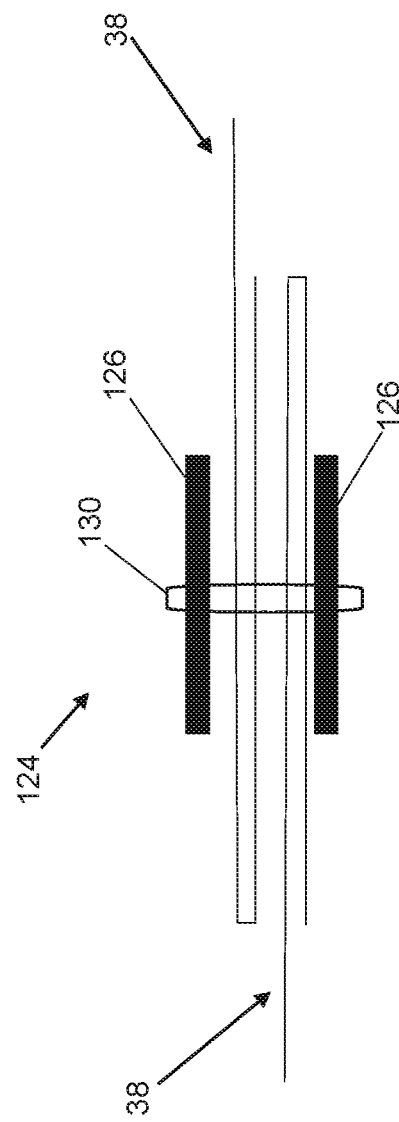

Referring now to FIGS. 5A and 5B, two sheets 38 of an example of clarifier 10 are shown coupled to each other. In the depicted embodiment, a side edge (e.g., 46*a*) of one sheet may be coupled to a side edge (e.g., 46*b*) of one other sheet via a fastener (e.g., 124). As shown, sheet(s) 38 overlap at least one other of the sheets. In some embodiments, side edge (e.g., 46*a*) may be folded over on itself so that openings 78 of a single sheet (e.g., 38) are aligned to receive a fastener (e.g., 124). These openings 78 may be positioned such that are aligned with opening(s) of one other sheet (e.g., 38) and a fastener (e.g., 124) may be inserted to couple the sheets together. In this way, the force acting at each opening of the sheets may be decreased to enable clarifier 10 to cover launder channel 18 in extreme weather.

In the depicted embodiment, fastener 124 may comprise one or more button(s) 126 and a strap 130. As shown, button 126 is round (e.g, circular); in other embodiments, however, button(s) may comprise any suitable shape or profile, such as polygonal (e.g., quadrilateral, hexagonal, octagonal, and/or the like), curved (e.g., convex or concave), round (e.g., circular, elliptical, or the like), or combination thereof. In some embodiments, button(s) 126 may comprise a body with one or more apertures to engage one other component of fastener 124 (e.g., strap 130). Each button 126 may be coupled to strap 130 in any suitable manner. For example, a portion of strap 130 may extend through each button 126 (e.g., via apertures).

In the depicted embodiment, a first button (e.g., 126) and a second button (e.g., 126) are positioned on opposing sides of sheets 38 while strap 130 is positioned though openings 78 to secure sheets 38. As shown, button(s) 126 have a maximum transverse dimension that is greater than opening 78 to prevent button(s) from going through opening 78. In such embodiments, strap 130 may be inserted through opening 78 of adjacent sheets (e.g., 38) and coupled to button(s) 126 to secure the sheets together. Accordingly, strap 130 may be coupled to button(s) 126 after being inserted though opening 78 to secure sheets (e.g., 38). In other embodiments, strap 130 may be coupled to a first button (e.g., 126) before extending though opening 78 and being coupled to a second button (e.g., 126). In this manner, strap 130 and a button (e.g., 126) may be easily uncoupled to disengage sheets 38 for access to launder channel 18. In some embodiments, button(s) 126 may be moveable (e.g., translatable, rotatable, etc.) relative to strap 130 to allow for fastener 124 to easily decouple to sheets 38.

In other embodiments, a maximum transverse dimension of each button 126 may be substantially equal to the maximum transverse dimension of each opening 78. Accordingly, each button may only be able to slide through opening 78 upon the application of force at a specific orientation relative to the opening. In this embodiment, a first button 126 and a portion of strap 130 may be inserted though opening 78 of adjacent sheets (e.g., 38) to couple the sheets together. In this manner, only one button (e.g., 126) is required to be uncoupled (e.g., inserted through opening 78) to access the channel 18. The fastener 124 may remain coupled to one of the sheets (e.g., 38) while performing maintenance in the launder channel 18 to allow for easy reattachment to other sheets (e.g., 38) once maintenance is completed.

Figure 6B:
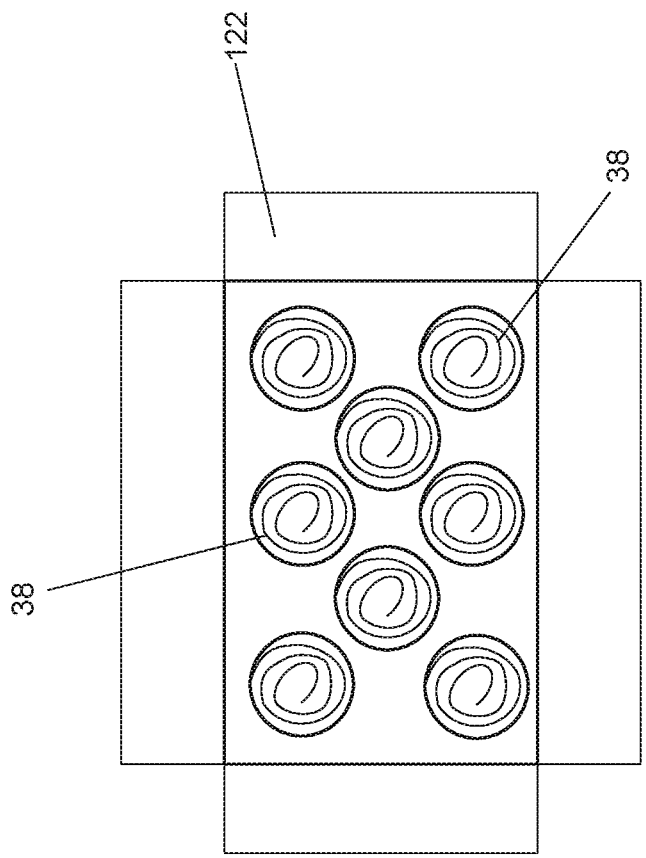
FIGS. 6A and 6B are top views of a package that can contain multiple flexible sheets of a launder cover in stacked and rolled configurations, respectively.
Figure 6A:
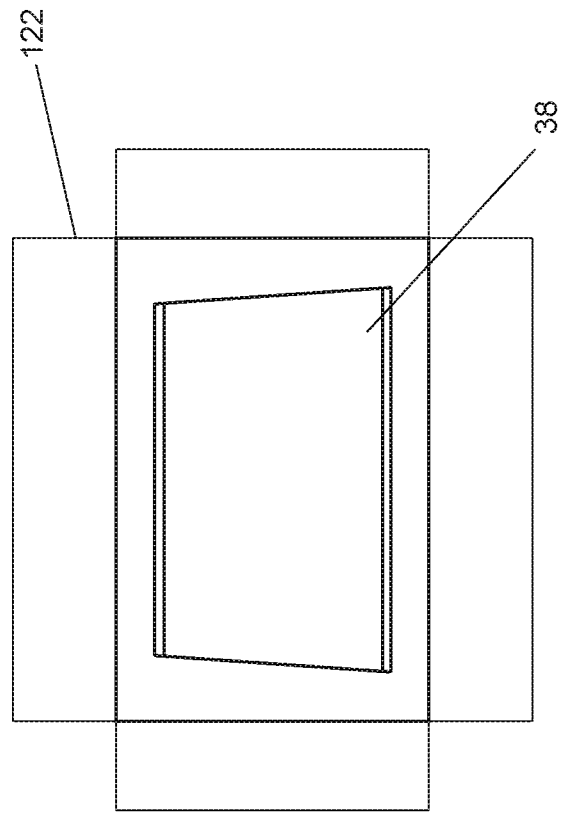

As shown, a plurality of fasteners 124 may be employed to couple sheets together. In some embodiments, one fastener (e.g., 124) may be positioned closer to the inner edge 42a and one other fastener (e.g., 124) may be positioned closer to outer edge 42b, so that one a portion of the fasteners need to be removed to access channel 18. In this way, fastener 124 can securely couple two or more sheets 38 together to protect launder channel 18 from the elements while still maintaining flexibility to allow access to the channel without complete removal of the sheets. Referring to FIGS. 6A and 6B, sheet(s) 38 of launder cover 34 can be delivered to clarifier 10 in a package 122. Package 122 may comprise heavy-duty paper (e.g., corrugated fiberboard, card stock, paperboard), a polymer, wood, metal, composite material, and/or the like. Because sheet(s) 38 can be lightweight and deformable, when launder cover 34 includes multiple (e.g., two or more) sheets, package 122 can contain more than one sheet. Sheets 38 can be packaged in any suitable manner; for example, the sheets can be stacked on one another (FIG. 6A) and/or each of the sheets can be rolled (FIG. 6B). This can facilitate transportation of sheets 38 to clarifier 10, at least by the sheets—which can be configured to cover a relatively large surface area (e.g., of launder channel 18)—to be contained within a relatively small package 122.

Some of the present methods of covering a launder channel (e.g., 18) that is at least partially defined between inner and outer walls (e.g., 30a and 30b) of a clarifier (e.g., 10) (e.g., any of those described above) can comprise a step of disposing one or more flexible sheets (e.g., 38) over at least a majority (up to and including all) of the launder channel. The launder cover can be so disposed at least by, for each of the sheet(s), coupling an inner edge (e.g., 42a) of the sheet to the inner wall and an outer edge (e.g., 42b) of the sheet that is opposite the inner edge to the outer wall. Each of the sheet(s) can extend from the outer wall (e.g., 30b) toward a tank (e.g., 14) of the clarifier, the launder channel being disposed along at least a majority of a periphery (e.g., 22) of the tank. Each of the sheet(s) can comprise any of the above-described sheets and can be coupled to the inner and outer walls in any of the manners described above (e.g., by using, for each of the sheet(s), one or more brackets (e.g., 86), one or more fasteners (e.g., 82), one or more straps (e.g., 84), and/or the like). To access the launder channel, some methods include a step of at least partially uncovering the launder channel at least by, for at least one of the sheet(s), decoupling a single one of the inner and outer edges from the inner and outer walls (e.g., such that the other of the edges remains coupled) and deforming the sheet to at least partially uncover the launder channel.

Some methods include a step of transporting the sheet(s) to the clarifier. To transport the sheet(s), some methods comprise disposing the sheet(s)—including multiples one of the sheets, if present—in a package (e.g., 122). Some methods comprise rolling each of the sheet(s) and/or stacking the sheet(s) in the package. These steps can be performed manually by an operator, by an operator with the aid of assembly automation equipment, and/or by a fully automated assembly system.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A clarifier comprising:
    a tank comprising:
        a floor;
        an inner wall;
        an outer wall extending upwardly from the floor such that the tank is at least partially defined by the inner wall; and
        a launder channel at least partially defined between the inner and outer walls and is disposed along at least a majority of a periphery of the tank; and
    a launder cover comprising one or more flexible sheets disposed over at least a majority of the launder channel, wherein each of the sheet(s):
        has opposing inner and outer edges, the inner edge coupled to the inner wall and the outer edge coupled to the outer wall; and
        is configured such that, when a single one of the inner and outer edges is decoupled from the inner and outer walls, the sheet is deformable to at least partially uncover the launder channel.

2. The clarifier of claim 1, comprising one or more brackets, each including:
    a base attached to the inner wall or outer wall; and
    an arm that is coupled to the base and the inner edge or outer edge of one of the sheet(s).

3. The clarifier of claim 2, wherein for each of the bracket(s):
    the arm has:
        opposing proximal and distal ends;
        a receptacle defined between upper and lower portions of the arm;
        a stop extending upwardly from the lower portion at the distal end; and
        an opening defined between the upper portion and the stop such that the opening is disposed closer to the distal end than is the receptacle; and
    a portion of one of the sheet(s) extends along the upper portion of the arm, through the opening, and into the receptacle such that the inner edge of the sheet is disposed in the receptacle.

4. The clarifier of claim 3, wherein:
- each of the sheet(s) includes a rigid support member that extends along at least a majority of the inner or outer edge of the sheet; and
- for each of the bracket(s), the rigid support member of one of the sheet(s) is disposed in the receptacle.

5. The clarifier of claim 1, wherein the outer edge of each of the sheet(s) is coupled to the outer wall via one or more straps.

6. The clarifier of claim 1, wherein each of the sheet(s) comprises, for at least one of the inner and outer edges, a rigid support member that extends along at least a majority of the edge.

7. The clarifier of claim 6, wherein each of the sheet(s), for at least one of the inner and outer edges, defines a sleeve along at least a majority of the edge and comprises a rigid support member disposed in the sleeve.

8. The clarifier of claim 1, wherein each of the sheet(s) comprises a geomembrane.

9. The clarifier of claim 1, wherein:
- the one or more sheets comprise two or more sheets;
- each of the sheets:
  - has opposing first and second side edges, each extending between the inner and outer edges; and
  - is positioned such that at least one of the side edges is adjacent to one of the side edges of another one of the sheets.

10. The clarifier of claim 1, wherein for each of the sheet(s) the outer edge is positioned at a height above the inner edge such that the sheet is inclined downward from the outer wall to the inner wall.

11. A launder cover comprising:
- one or more flexible sheets positionable over at least a majority of a launder channel that is at least partially defined between inner and outer walls of a clarifier;
- wherein each of the sheet(s):
  - has opposing inner and outer edges, the inner edge configured to be coupled to the inner wall and the outer edge configured to be coupled to the outer wall; and
  - is configured such that, when a single one of the inner and outer edges is decoupled from the inner and outer walls, the sheet is deformable to at least partially uncover the launder channel.

12. The launder cover of claim 11, comprising one or more brackets, each including:
- a base configured to be attached to the inner or outer walls; and
- an arm coupled to the base and having:
  - opposing proximal and distal ends;
  - a receptacle defined between upper and lower portions of the arm;
  - a stop extending upwardly from the lower portion at the distal end; and
  - an opening defined between the upper portion and the stop such that:
    - the opening is disposed closer to the distal end than is the receptacle; and
    - a portion of one of the sheet(s) is permitted to extend along the upper portion of the arm, through the opening, and into the receptacle such that the inner edge or outer edge of the sheet is disposed in the receptacle.

13. The launder cover of claim 12, comprising:
- for each of the sheet(s), a rigid support member configured to extend along at least a majority of the inner edge or outer edge of the sheet;
- wherein for each of the bracket(s), the receptacle of the arm is configured to receive one of the support member(s).

14. The launder cover of claim 11, comprising, for each of the sheet(s), one or more straps configured to couple the outer edge of the sheet to the outer wall.

15. The launder cover of claim 14, comprising, for each of the sheet(s), for at least one of the inner and outer edges:
- a rigid support member;
- wherein the sheet defines a sleeve along at least a majority of the edge configured to receive the rigid support member.

16. The launder cover of claim 11, wherein each of the sheet(s) comprises a geomembrane.

17. The launder cover of claim 11, wherein for each of the sheet(s):
- each of the inner and outer edges is linear; and
- a length of the outer edge is at least 2% larger than a length of the inner edge.

18. The launder cover of claim 11, wherein:
- the one or more sheets comprises two or more sheets;
- the sheets are disposed in a package; and
- each of the sheets is rolled.

19. A method of covering a launder channel that is at least partially defined between inner and outer walls of a clarifier, the method comprising:
- disposing one or more flexible sheets over at least a majority of the launder channel at least by, for each of the sheet(s), coupling an inner edge of the sheet to the inner wall and an outer edge of the sheet that is opposite the inner edge to the outer wall;
- wherein:
  - each of the sheet(s) is configured such that, when a single one of the inner and outer edges is decoupled from the inner and outer walls, the sheet is deformable to at least partially uncover the launder channel; and
  - the inner wall at least partially defines a tank such that the launder channel is disposed along at least a majority of a periphery of the tank.

20. The method of claim 19, wherein each of the sheet(s) comprises a geomembrane.

* * * * *